Nov. 18, 1969  A. WOLFENSPERGER  3,478,403
METHOD OF MAKING SEAT RING FOR PLUG VALVE
Original Filed March 1, 1965  9 Sheets-Sheet 1

FIG. 1

INVENTOR
ADOLPH WOLFENSPERGER

BY Strauch, Nolan, Neale,
Nies & Kurz  ATTORNEYS

Nov. 18, 1969    A. WOLFENSPERGER    3,478,403
METHOD OF MAKING SEAT RING FOR PLUG VALVE
Original Filed March 1, 1965    9 Sheets-Sheet 3

INVENTOR
ADOLPH WOLFENSPERGER

BY Strauch, Nolan, Neale,
Nies & Kurz    ATTORNEY

INVENTOR
ADOLPH WOLFENSPERGER

Nov. 18, 1969          A. WOLFENSPERGER          3,478,403
METHOD OF MAKING SEAT RING FOR PLUG VALVE
Original Filed March 1, 1965          9 Sheets-Sheet 7

INVENTOR
ADOLPH WOLFENSPERGER

BY Strauch, Nolan, Neale,
Nies & Kurz    ATTORNEYS

Nov. 18, 1969  A. WOLFENSPERGER  3,478,403
METHOD OF MAKING SEAT RING FOR PLUG VALVE
Original Filed March 1, 1965  9 Sheets-Sheet 8

INVENTOR
ADOLPH WOLFENSPERGER

ATTORNEYS

Nov. 18, 1969   A. WOLFENSPERGER   3,478,403
METHOD OF MAKING SEAT RING FOR PLUG VALVE
Original Filed March 1, 1965   9 Sheets-Sheet 9

INVENTOR
ADOLPH WOLFENSPERGER

BY *Strauch, Nolan, Neale,*
*Nies & Kurz*   ATTORNEYS 3,478,403
METHOD OF MAKING SEAT RING
FOR PLUG VALVE
Adolph Wolfensperger, Kearney, Nebr., assignor to Rockwell Manufacturing Company, Pittsburgh, Pa., a corporation of Pennsylvania
Original application Mar. 1, 1965, Ser. No. 435,838, now Patent No. 3,424,190, dated Jan. 28, 1969. Divided and this application Mar. 13, 1968, Ser. No. 734,503
Int. Cl. B21d 53/00; B23p 13/00
U.S. Cl. 29—157                                    4 Claims

ABSTRACT OF THE DISCLOSURE

A method of making a preformed plug seating ring for a ball type valve assembly comprises the steps of providing a relatively rigid ring of resilient metal having an annular arcuate surface at one side, mounting said ring in a fixture and deforming said ring axially of said surface, accurately forming said surface to temporary spherical contour while the ring is held deformed in said fixture, and releasing said ring from the fixture to relax and allow said formed surface to assume a desired non-spherical contour which is substantially that assumed by the initially spherical surface of a ball plug exposed to full upstream line pressure as the ring resiliently tends to resume its initial condition.

---

This is a division of my copending application Ser. No. 435,838 filed Mar. 1, 1965 for valve assembly and method.

This invention relates to plug valves of the type wherein a plug is rotatably mounted on cooperating seat ring surfaces within a valve body and it particularly concerned with special seat ring mounting and constructions and method of performing seat rings, as well as overall improvements in the valve assembly.

Plug valves of this general type, sometimes called ball valves, have been known for some time. The main problems encountered in these valves involve fluid tight sealing at the plug seats under operational conditions and reduction of the torques needed to turn the plug between open and closed valve positions. Various seat configurations and modes of lubrication have been proposed and found helpful but the problems have not been satisfactorily solved by these proposals.

The present invention provides an entirely new ball valve assembly including seat rings that are of novel construction and have novel association with the plug, and wherein the seat rings are preferably preformed in a novel manner to enable them to fit more efficiently in sealing relation with the plug under rated line pressure conditions of the operation.

It is the major object of the invention to provide a ball type plug valve assembly of novel construction.

Another object of the invention is to provide a novel method of performing the plug engaging surface of a seat ring.

It is a further object of the invention to provide a plug valve assembly of the type wherein a rotatable plug has substantially spherical surface engagement with seat rings of novel construction and association with the plug.

Another object of the invention is to provide a plug valve assembly of the type wherein a rotatable plug has substantially spherical surface engagement with seat rings that have been specially preformed so that their plug seating surfaces match deformation of the spherical plug surface under rated line fluid pressures during operational conditions.

Another object of the invention is to provide for a ball-type plug valve a novel ball valve seat ring having a special seating surface formed by spherically lapping the seat ring while holding the seat ring deformed and releasing the seat ring to allow the seating surface to assume a special contour which matches that of the deformed spherical plug surface under rated line pressures.

A further object of the invention is to provide a novel ball valve seat ring having an arcuate metal seating surface containing a ring of solid smooth plastic material such as tetrafluoroethylene that is effective to provide an initial seal with the associated ball surface at least at zero line pressures or low pressure differentials across the valve.

Another object of the invention is to provide a novel ball valve assembly wherein at least one seat ring has a solid plastic insert ring engaging the ball surface for initial sealing and coacting means is provided for introducing a fluent sealant and lubricant plastic material through the seat ring into the space between the seat ring and ball surfaces.

A further object of the invention is to provide a ball valve assembly having a shiftably mounted seat ring and novel conduit arrangements for introducing sealant or lubricant through the ring to the ball surface in any operative position of the seat ring.

Another object of the invention is to provide a novel trunnion mounted ball valve assembly. Pursuant to this object a novel thrust adjustment for relieving the seat rings of the weight of the ball is provided.

Another object of the invention is to provide a ball valve assembly wherein seat rings are resiliently urged against opposite sides of a ball type plug within the valve body and wherein novel arrangements are made for venting excess fluid pressure from the valve body. Pursuant to this object these arrangements embody novel seat ring constructions.

Further objects will appear as the description proceeds in connection with the appended claims and the annexed drawings wherein:

FIGURES 15 and 16 are fragmentary similar views showing an optional excess pressure venting arrangement for the body cavity wherein a special resilient annulus that normally urges the seat ring toward the plug is displaceable under excess pressure to vent the body cavity.

Figure 1:
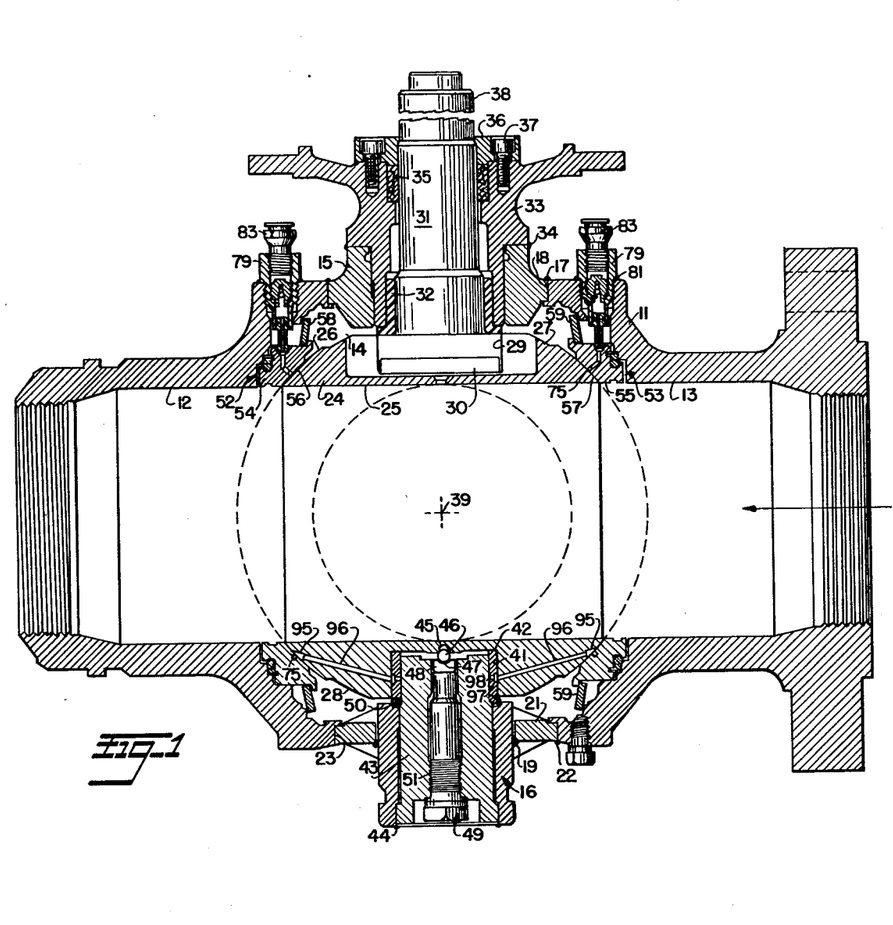
FIGURE 1 is a section through a ball valve assembly according to a preferred embodiment of the invention.
Figure 2:
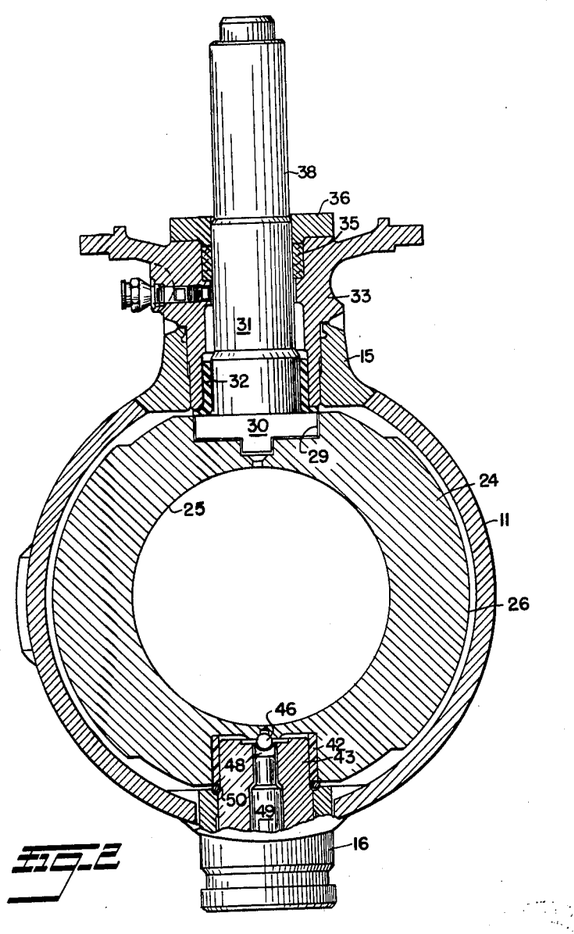
FIGURE 2 is a section through the valve assembly of FIGURE 1 at right angles to the section plane of FIGURE 1.

Referring mainly to FIGURES 1 and 2, the valve according to the preferred structural embodiment of the invention comprises a rigid metal body 11 having opposed aligned similar cylindrical flow passages 12 and 13 on opposite sides of a central plug receiving chamber 14. The valve as shown is a two way valve, but for purposes of this disclosure passage 12 may be considered the outlet or downstream side, passage 13 the inlet or upstream side, fluid flow as shown by the arrow in passage 13.

Valve body 11 has an upper rigid hollow valve stem boss 15 disposed in axial alignment with a lower rigid trunnion boss 16. Stem boss 15 may be an annulus peripherally welded at 17 in a circular juncture with an upper body aperture 18. Trunnion boss 16 may be an annulus welded at 19 to a circular plate 21 which in turn is welded at 22 in a circular juncture with a lower body aperture 23.

Disposed within body chamber 14 is a ball-type plug 24 having a cylindrical through port 25 which is of the same diameter as passages 12 and 13. When the valve is open as shown in FIGURE 1, port 25 is substantially continuous with passages 12 and 13. At opposite ends port 25 terminates in the spherical surface 26 of plug 24 which preferably otherwise comprises the entire outer surface of plug 24 except the top and bottom relieved areas at 27 and 28.

At its upper end valve plug 24 is recessed at 29 to receive the T-shaped rectangular lower end 30 of a cylindrical valve stem 31 which is journalled as by a bushing 32 within a gland 33 suitably rigidly secured as by welding at 34 to body boss 15. A packing 35 around the upper end of stem 31 and held in place by a retainer collar 36 prevents outward leakage of fluid along the valve stem. Collar 36 is removably secured to the gland 33 as by cap screws 37 so that the packing may be renewed. When an operator applies torque to the upper end 38 of valve stem 31, plug 24 may be rotated about its central axis 39 which normally lies on the axis of rotation of stem 31 and in the axis of passage 12, 13.

At its lower end plug 24 is formed with a cylindrical recess 41 lined with a cylindrical bearing bushing 42 surrounding the rigid cylindrical trunnion 43. At its lower end trunnion 43 is secured to boss 16 along the circular weld region 44 so as to be substantially integral with the valve body. The trunnion 43, bushing 42 and recess 41 are coaxial with valve stem 31.

In the bottom floor of recess 41, plug 24 is formed with a conical seat 45 concentric with recess 41. A hard metal spherical thrust ball 46 is disposed between seat 45 and a concave seat 47 on a thrust seat member 48 in abutment with the end of an adjustment screw assembly unit 49 threaded within the central bore of a trunnion 43 at 51. Screw 49 has a bolt-type head for applying a wrench and may thereby be rotated to provide a centralized thrust bearing for ball 24. A suitable rubber or like O-ring seal is provided between bushing 42 and the valve body at 50.

Figures 3, 4:
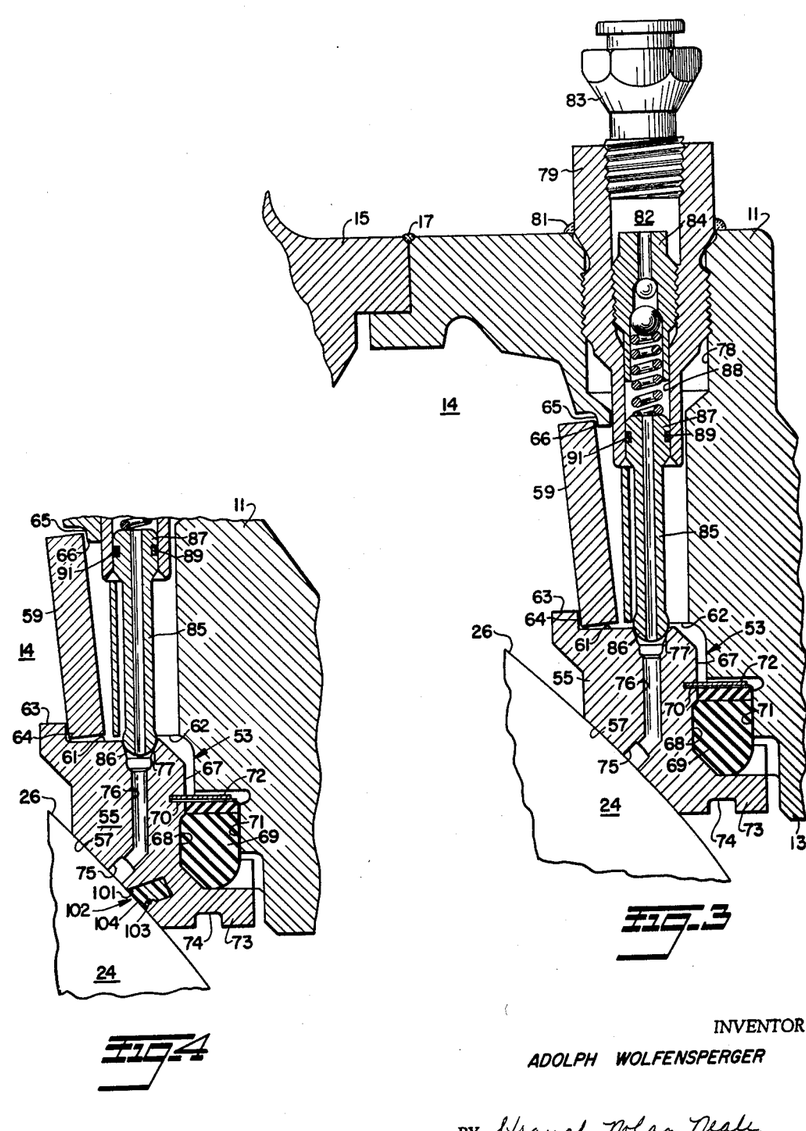
FIGURE 3 is an enlarged fragmentary view in section showing the upstream valve seat ring structure and mounting and the sealant introduction arrangements.
FIGURE 4 is an enlarged fragmentary view in section similar to FIGURE 3 but showing a valve seat ring having an insert annulus of solid plastic in the seating surface.

Surrounding the inner ends of flow passages 12 and 13 are annular identical recessed regions indicated at 52 and 53 respectively, and the preferred detailed structure of these regions is illustrated enlarged in FIGURE 3. Disposed within these recessed regions are integral metal seat rings 54 and 55 respectively. Upstream seat ring 55 has an annular substantially spherical surface 57 engaging spherical ball surface 26 at one side, and downstream seat ring 54 has an annular substantially spherical surface 56 engaging spherical ball surface 26 at the other side.

As will appear seat rings 54 and 55 which have relatively rigid and normally non-deformable ball seating surfaces under operating conditions are mounted in their recessed body regions for movement toward and away from ball 24, this movement being axially of the flow passage 12, 13. A relatively strong resilient means is provided to initially constantly bias both seat rings 54 and 55 into full surface engagement with ball 24. In the preferred embodiment this resilient means comprises dish-shaped annular plate springs 58 and 59 reacting between the valve body and rings 54 and 55 respectively. Resilient seal rings between the back faces of the seat rings and the body also contribute to this bias as will appear.

Reference is now made to FIGURE 3 which shows in enlarged detail the upstream seat ring 55 construction and mounting. Ring 54 has the same construction.

Ring 55 is of relatively complex structure, but of uniform cross-section all round. It is solid steel except where cut away and comprises essentially an outer cylindrical peripheral surface 61 and an arcuate seating surface 57. It will be observed that peripheral surface 61 has a definite clearance all around with corresponding body surface 62 of the recess region 53, whereby the seat ring 55 is capable of deliberately providing radial float in the assembly.

A ledge 63 surrounds the inner peripheral edge of ring 55, and the inner edge 64 of the inner periphery of plate spring 59 seats against this ledge 63. The diagonally opposite edge 65 of the outer periphery of plate spring 59 seats against an annular face 66 of body 11. Since ring edges 64 and 66 are spaced from each other in the axial direction a distance less than the plate thickness of the spring, the spring is resiliently deformed in the assembly and tends to urge ring 55 to the left toward the ball 24 in FIGURE 3. It will be noted that there is deliberately provided axial clearance between the back face 67 of ring 55 and the adjacent radial body wall.

Ring face 67 opposite the ball engaging surface is grooved at 68 to mount a resilient annulus 69 that is compressed axially of the valve body between groove 68 and a radial body face 71. Above annulus 69 the back face of ring 55 is annularly grooved at 70 to mount a metal snap ring 72 that surrounds and circumferentially contains the annulus 69. Ring 72 also cooperates with the inner rim 73 of ring 55 to radially contain the annulus against undesired extrusion, and this arrangement permits the above described radial float of the ring 55. Annulus 69 provides a fluid tight seal between seat ring 55 and the body wall and it also biases the seat ring 55 toward plug 24. An annular groove 74, the purpose of which will later appear, is formed around the inner periphery of ring 55.

An annular continuous groove 75 is formed in the arcuate seating surface 57 coaxially of ring 55. Preferably groove 75 is centered with respect to surface 57. A passage 76 extends transversely through seat ring 55 from an external conically tapered opening 77 in the peripheral surface of the ring 55 to groove 75.

Referring to FIGURE 3, the valve body wall is formed with a bore 78 to receive a threaded hollow fitting mount member 79. If desired member 79 may be welded to the body at 81. Within member 79 is a space 82 for holding a charge of fluent plastic sealant and lubricant material. This space extends between an external threaded fitting head 83 and an internal check valve unit 84. Head 83 may be rotated for pressurizing the material in space 82, and it may be an Alemite-type or like fitting for introducing the plastic material into space 82 under pressure. Check valve 84 permits flow of the plastic material only toward seat ring 55.

Flexible conduit means connects the inner end of the fitting 79 to the seat ring 55 for maintaining fluent plastic material communication to the seating groove 75 while permitting free axial and/or radial movement of the seat ring. This comprises a tube 85 having a spherically rounded end 86 universally rockably disposed in opening 77 and an enlarged end 87 formed to have a rocking sliding fit within bore 88 of the fitting. An O-ring type seal 89 is disposed in a groove 91 in tube end 87.

From the foregoing it is apparent that plastic material from space 82 may be displaced under pressure through the check valve 84, conduit tube 85 and passage 76 into groove 75 regardless of the position of ring 55 in the assembly.

Downstream seat ring 54 has the same structure, mounting and sealant introduction arrangements as ring 55, and the same numerals are used for corresponding parts.

Referring to FIGURE 1, at each side of the plug 24 a surface recess 95 is formed adapted to align with the groove 75 of seat 55 at least when the valve is open, and a passage 96 extends through plug 24 into the recess 41 where it aligns with an annular lubricant distribution groove 97 in bushing 42. A series of annular ports 98 connect groove 97 with the trunnion bearing surface. An identical passage 96 connects the groove 75 in seat 54 with the other side of bushing 42. In this manner, the trunnion bearing surfaces may be lubricated by increasing the pressure of the material at either fitting head 83.

In the valve assembly of FIGURES 1-3 continuous bands of plastic sealant material are maintained in grooves 75 around the inlet and outlet body passages. By increasing the pressure in either space 82 sufficient force may be produced at the associated groove 75 to relatively separate the plug and ring surfaces sufficiently to distribute a layer of the sealant material between their entire coextensive areas. This is particularly valuable where the plug and seat ring may be corroded or otherwise bonded together. The plastic material at the interface between the seat rings and the plug besides providing an annular band of sealant between the seat and plug surfaces has considerable lubricating value at those surfaces so as to reduce the torque required to turn the plug.

Figure 5:
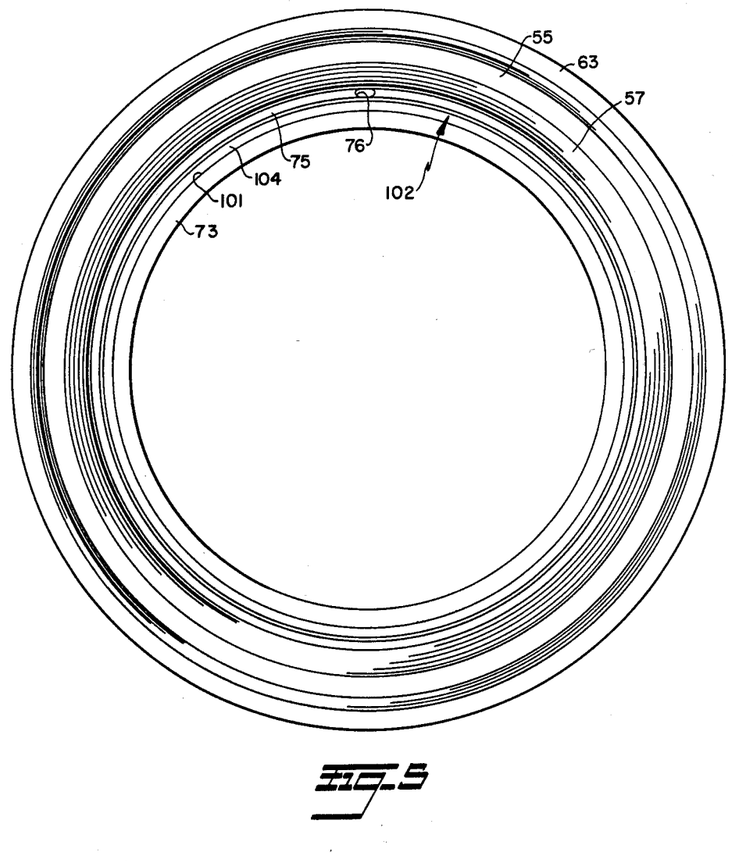
FIGURE 5 is an end view showing the annular seat ring of FIGURE 4.

FIGURES 4 and 5 illustrate an embodiment of the invention wherein each seat ring such as 55' is the same ring 55 in FIGURE 3 except that here the seat rings are each provided with an annular groove 101 in which is permanently mounted as by molding an integral solid insert ring 102 of some suitable hard plastic such as polytetrafluoroethylene. Ring 102 is anchored in groove 101 by internal ridges 103 which form interlocks with the ring during the molding.

Ring 102 has a continuous annular surface 104 that slidably abuts plug surface 26. Surface 104 preferably initially projects a small distance out of ring surface 57 and is preferably of the same spherical contour as the spherical surface 26. Under the pressure of combined spring 59 and resilient annulus 69 urging the seat ring 55 toward the plug 24, a condition which exists mainly when there is no flow in the system or when the valve is open or the line pressure is very low, ring 102 is under compression and only surface 104 may engage plug surface 26 along an annular band and this is sufficient to provide a fluid tight seal. Under the closed valve operating condition where the upstream seat and the plug are exposed to full line pressure, the material of insert ring 102 may compress until surface 104 is substantially continuous with ring surface 57. As the valve is used the smooth hard surface at 104 deformably conforms itself to plug surface 26, and the annular zone of contact provided at surface 104 has very low friction at all times so that it contributes to reduced turning torque of the plug even should no lubricant or sealant be supplied to groove 75.

In the foregoing assembly the ball 24 is rotatably mounted on the seat rings 54 and 55 to block passage 12, 13, or align port 25 with the passage. The trunnion mounting of the plug 24 prevents axial displacement of the plug, and the seat rings are always resiliently biased toward the plug surfaces. The thrust bearing at 46 is effective to relieve the seat rings of excess weight of the plug, and this is important in large valve where a heavy plug resting on the seat rings will tend to distort them. Thus the thrust mounting of plug 24 aids in maintaining a good annular fit between the plug surface and the seat rings at all times.

FIGURES 1-5 illustrate the ring seating surface 57 as substantially spherically coextensive with spherical surface 26 of the plug 24. Preferably however each of seat rings 54 and 55 is specially preformed, as will be described in connection with FIGURES 6-13 so that surface 57 is not truly spherical with surface 26 but is of a special curvature that matches the deformed curvature assumed by ball surface under rated line pressure conditions in the valve assembly.

Prior to the invention it was common practice in valves of this general type to machine and finish the plug surface 26 and the matching seat ring surfaces 56 and 57 here to the same spherical contour with great accuracy before assembling the parts into the finished valve. This accuracy was obtained by lapping the ball surface 26 into the seat ring surfaces, and when the valve was assembled they were in substantially full area contact.

However, it has been discovered that under operating conditions in these valves the line fluid pressure acting on the full spherical surface of the closed plug tends to deform or flatten that surface in such manner as to reduce its area of contact with the upstream seat ring, so that high torque producing unit pressures ensue between the ball and seat rings.

The invention solves the problem by providing a novel manner of preforming seat rings so that substantially full area contact is provided between the valve plug and the upstream seat ring under rated full line pressure conditions in the closed valve.

Figure 6:
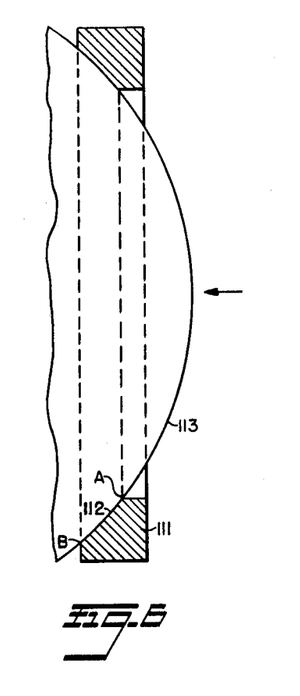
FIGURES 6–8 are diagrammatic views showing the effect of line fluid pressure in conventional ball valves.
Figure 7:
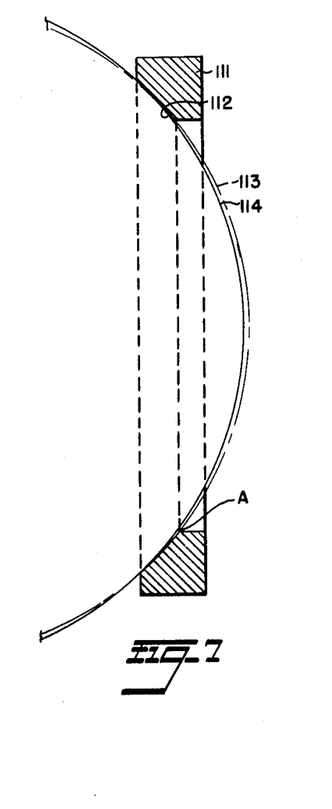
Figure 8:
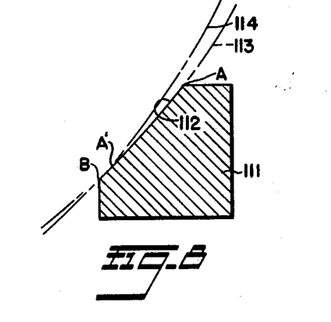

Reference will first be made to FIGURES 6-8 which diagrammatically explain the problem.

FIGURE 6 shows the basic assembly of a closed ball type valve wherein the upstream annular seat ring 111 surrounding the inlet passage has a spherical surface 112 in smooth coextensive contact with the spherical surface 113 of a plug. This is the ideal condition which theoretically exists when the spherical surfaces are accurately formed to the same contour on the same axis.

However in operation fluid pressure in the direction of the arrow in FIGURE 6 exerts a pressure to the left when the valve is closed. The effect of line pressure in the arrangement of FIGURE 6 is to so deform the ball plug that its initially spherical surface at 113 assumes a less spherical 114 flattened condition shown at FIGURE 7. For purposes of this explanation consider the upstream seat ring 111 as non-deformable.

As a result the temporarily deformed flattened surface of the plug becomes separated from seat ring 111 along and adjacent the primary seal area at A and the area of primary seal moves out toward the circular region B to a new location indicated at A' in FIGURE 8 which is an enlarged fragment of FIGURE 7. This separation enables the line pressure to enter the space between ring 111 and the plug to act on a larger area of the plug surface, and it also balances against the fluid pressure acting on the upstream side of the seat ring 111 thereby causing a reduction of the net seating force of ring 111 with respect to the plug being applied over the annular area between A' and B. These combinations of circumstances, especially in high pressure valves where the line fluid pressures may be in excess of 1000 pounds per square inch, result in high turning torques between the seat ring and plug and may even result in leakage between the seat ring 111 and the plug surfaces.

In the present invention the foregoing undesirable condition is eliminated by preforming the seat ring in a special manner with its surface curvature so formed and arranged as to have substantially full area contact with the cooperating surface of the plug when the plug is deformed by line fluid thrust at the pressures for which the valve is designed.

Figure 9:
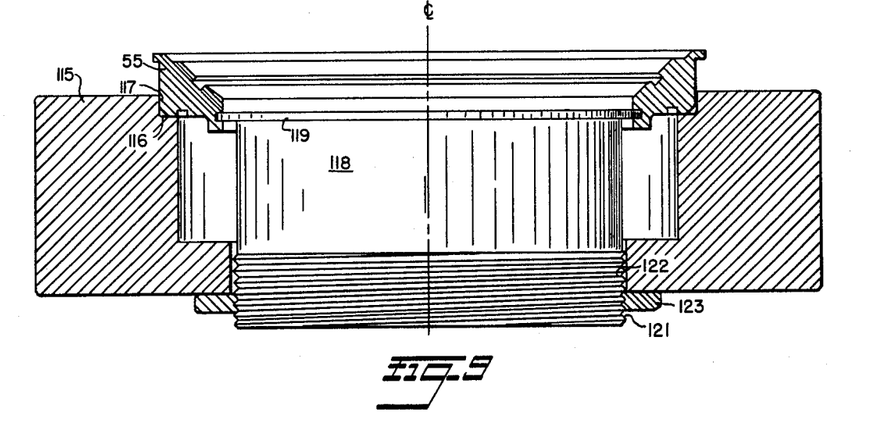
FIGURE 9 is a diagrammatic view mainly in section showing a fixture wherein the seat ring preforming method may be accomplished.

FIGURE 9 illustrates the seat ring 55 diagrammatically mounted in a fixture for carrying out the novel method of the invention.

Figure 10:
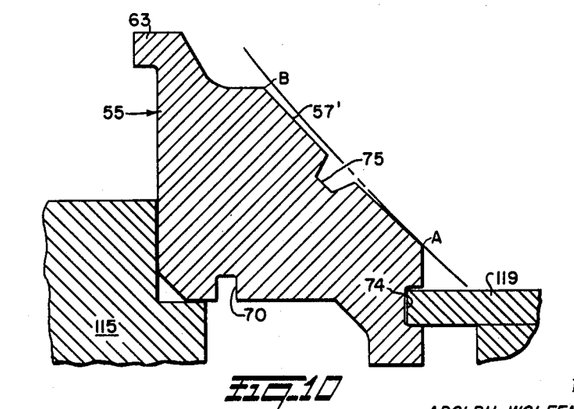
FIGURE 10 is an enlarged fragmentary section showing the seat ring prior to preforming.

Prior to mounting it in the fixture of FIGURE 9 the seat ring is machined to preliminary form from an annulus of good quality steel having the necessary hardness and resillience. A section of this preliminary ring is shown in FIGURE 10. The various grooves 70, 74 and 75 and ledge 63 are formed, and the surface 57' is spherically formed with its center lying on axial centerline of the ring. If this ring which is now formed to the condition hitherto considered as finished were to be mounted in the valve assembly it would conform, at no line fluid pressure, in full area contact to the spherical plug surface 26 indicated in broken lines in FIGURE 10.

The foregoing operation of spherically forming surface 57' may take place while the unstressed ring is mounted in the fixture as shown in FIGURE 9.

The fixture comprises a rigid heavy base 115 formed with an internal flat ledge 116 intersecting at right angles a cylindrical wall 117. When the ring 55 is placed on base 115 its outer periphery fits snugly within wall 117 and the radially outer annular region of its back surface outwardly of groove 70 is seated on ledge 116. The fixture also comprises a central member 118 having a rim 119 adapted to seat within seat ring groove 74 and a threaded post section 121 extending through an aperture 122 in base 115 to receive a threaded adjustment member 123. The rim 119 is shown diagrammatically only but in practice it may comprise two semi-circular elements adapted to be contacted into member 118 during assembly with the ring and then expanded into groove 74 to provide the essentially solid connection indicated in FIGURE 9. The particular mechanism of the fixture is not part of the invention.

Figure 11:
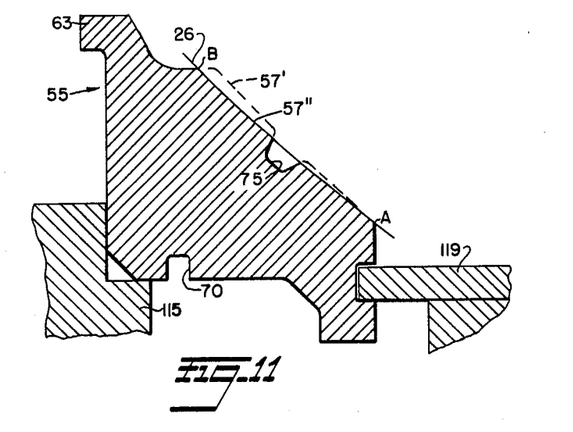
FIGURE 11 is an enlarged fragmentary section illustrating ring preforming method steps.

In any event it will be seen that turning of member 123 may provide an axial pull on the inner peripheral region of the ring 55 held seated on ledge 116 which will result in the ring being correspondingly deofrmed about its center of gravity and this condition is illustrated in FIGURE 11 wherein spherical surface 57' is now distorted to the condition there illustrated, the point A being axially displaced a predetermined distance downwardlly in FIGURE 11 but point B being not displaced axially of the ring. With ring 55 held in this deformed condition, the undeformed plug 24 is lapped into spherical surface fit with ring 55, the spherical plug surface being shown at 26 in FIGURE 11.

During this lapping operation a new truly spherical surface 57" is formed on ring 55 which includes the primary seal area A. Material is removed from the ring seating surface increasingly outward toward B. The lapping operation is of the conventional type using known lapping compounds between the surfaces and mounting ball 24 to exert pressure.

Figure 12:
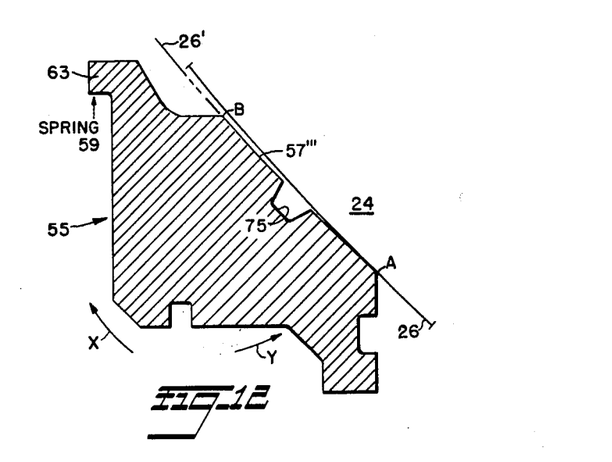
FIGURE 12 is an enlarged fragmentary view mainly in section showing engagement of the seat ring and ball plug under zero or low line pressure conditions.

After the lapping operation the ring 55 is removed from the fixture of FIGURE 9 and is ready for assembly into the valve. When the deforming force is removed from the ring 55, the ring resiliently returns to unstressed condition and the seating surface assumes a new curvature shown at 57''' in FIGURE 12. FIGURE 12 illustrates in full lines the association of upstream seat ring and plug that would exist should the released preformed ring 55 be initially placed in the valve assembly without being axially loaded only by the resilience of spring 59. The unloaded seat ring 55 and the spherical surface 26 of plug 24 would initially contact over a narrow annular band at the primary seal region A and the remainder of surface 57''' would be spaced from surface 26.

The plate spring 59 is however so designed and of each strength that when it is placed in the assembly during installation it exerts upon seat ring 55 an initial axial force that deformably uniformly twists the ring 55 substantially about the point A in FIGURE 12 in the direction of arrow X sufficiently to cause the seating surface of the ring 55 to regain substantially its spherical contour 57" shown in FIGURE 11 and become associated in full surface engagement with spherical surface 26 of the ball 24, this condition being illustrated in FIGURE 3.

This association of parts exists during conditions of no fluid flow or when the valve is open and other conditions where there is low or no fluid pressure differential across the valve, and for one thing it insures that lubricant under pressure in groove 75 does not escape into the line.

However, with the valve plug 24 in closed position and line pressure rising to its rated value, the spherical surface 26 of plug 24 will flatten under pressure as explained above toward the shape shown in dotted lines at 26' in FIGURE 12. As the sphere surface flattens the seal region A follows the changing shape of the ball surface and the ball and seat ring surfaces move into increasingly wider area contact. As ring 55 effectively untwists in the direction of the arrow Y in FIGURE 12 its ball seating surface changes contour toward the relaxed shape 57''' until at rated line pressure in the valve assembly during normal operation there is maximum surface engagement between the seat ring and ball surfaces and the seat ring surface 57''' will have full surface contact with the pressure deformed ball surface 26' illustrated in FIGURE 12. At this point the seat ring 55 has relaxed so as to be free of twisting stresses.

The necessary amount of deformation of ring 55 prior to lapping in the fixture of FIGURE 9 for obtaining the optimum curvature of ring surface 57''' may be determined empirically from data derived from observing the deforming effect of pressure on ball surface 26. The operation is such that the curvature of final surface 57''' in the released ring is essentially that of the flattened ring surface 26' under rated line pressure. As the ball surface flattens under pressure the point A follows to remain in contact with the ball surface and the annular area of contact increases radially outwardly as the pressure increases. The force applied to deform the spring is so related to the other factors such as rated line pressure that the seat ring maintains substantially full surface contact with the ball during all line pressure conditions.

Figure 13:
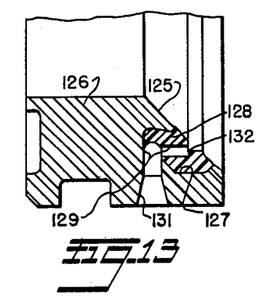
FIGURE 13 is a fragmentary view in section showing a metal seat ring having a plastic insert ring in its seating surface and a sealant introduction passage through the metal and plastic rings.

FIGURE 4 shows one form of ring provided with a solid plastic ring insert, and FIGURE 13 shows another form wherein the plug seating surface 125 of ring 126 is formed with an annular recess 127 in which is molded an annular insert body 128 of solid plastic. A passage 129 extends from the conical recess 131 in the outer periphery of ring 126 is formed with an annular recess 127 in which is molded an annular insert body 128 of solid plastic. A passage 129 extends from the conical recess 131 in the outer periphery of ring 126 through the ring metal and through the annulus 127 to terminate in an annular groove 132 centrally located in plastic insert 128. Ring 126 is mounted in the valve assembly similarly to seat rings 54 and 55 with the rounded end of conduit tube 85 seated in recess 131.

Preferably, however, high pressure valves where lubricant is introduced through the seat ring, the plastic insert ring is located radially inwardly of the lubricant groove 75 as in FIGURE 4.

In all forms of the invention whether lubricated or not and whether or not the seat ring has a plastic insert, the metal seating surface of the seat ring is formed to match the deformed shape of the flattened spherical surface of the ball.

In the two way valve of the preferred embodiment of the invention, during the time the valve plug is in closed position to effect the above described upstream seat at ring 55, the combined resilient forces of spring 58 and resilient annulus 69 at the downstream ring urge that ring into sealing engagement with the surface of ball 24 so that a downstream seal is provided which effectively traps any fluid under pressure within the body cavity space 14. Ordinarily if the valve is closed while the line is full of liquid some liquid is entrapped in the body space and should it expand as when it becomes heated it might even rupture the valve body itself.

The invention therefore includes novel pressure relief arrangements whereby excessive body pressure is vented to the downstream (lower pressure) end of the body.

Figure 14:
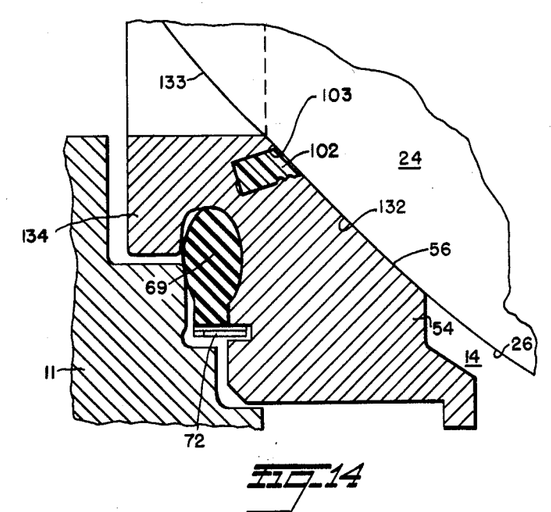
FIGURE 14 is a fragmentary view in section showing a pressure relief arrangement for venting excess pressure from the body cavity.
Figure 18:
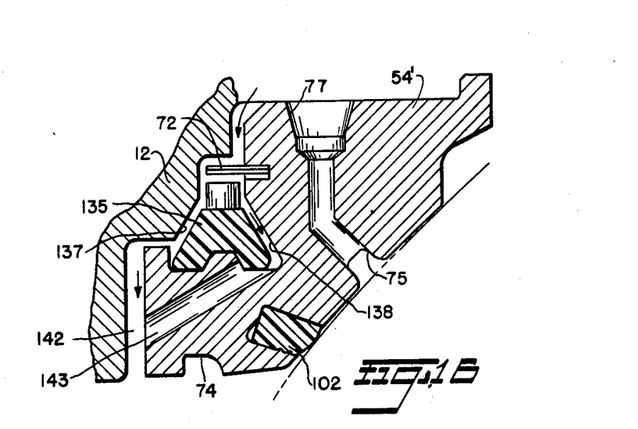
Figure 19:
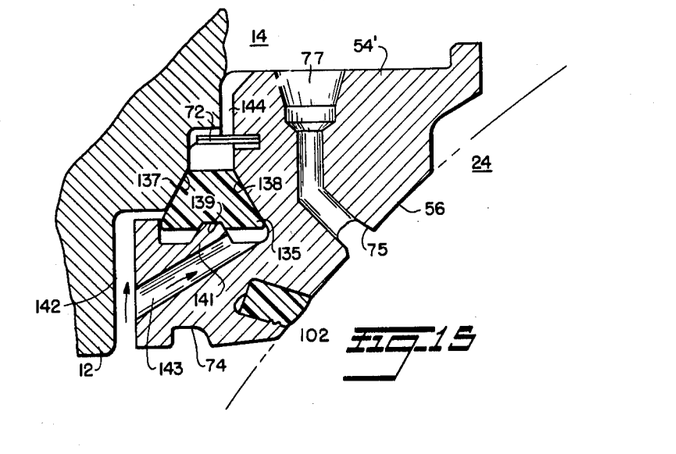

FIGURE 14 illustrates one manner of accomplishing this relief. The seat ring 54 in cross section is the same as ring 55 and when the valve is closed the ball is urged tightly against the rigid downstream seat 54 contacting it mainly in the annular region indicated at 132. The downstream plug surface at 133 even tends to bulge in the downstream direction beyond this region. The pressure of the liquid within body space 14 is therefore effective upon the plug seating surface of ring 54 outwardly of region 132. This force is opposed by spring 78 and annulus 69. In this form of the invention the seat ring 54 is formed with an outturned rim 134 that extends up around and confines part of annulus 69 to thereby reduce the resilient force of annulus to the right in FIGURE 14, and this provides an increased differential in the forces acting across the ring 54 which at times enables excessive pressures in space 14 to separate the seat ring and ball enough to relieve the excess pressure.

FIGURES 15 and 16 show another pressure relief embodiment wherein the seat ring has a special construction. Here ring 54 is of generally the same structure on the ball engaging side but annulus 69 is replaced by a resilient ring 135 of trapezoidal cross section which is fixed upon a backup ring 136 that abuts snap ring 72. The inclined opposed sides of resilient ring 136 engage inclined faces 137 and 138 respectively on the body and the seat ring 54 between which the trapezoidal ring is compressed. Ring 135 therefore provides a fluid tight seal and a resilient bias on the seat ring.

At its base the trapezoidal ring 136 is annularly grooved at 139 to fit with a narrow annular projection 141 on the seat ring, this arrangement enabling the major part of the wide base of resilient ring 135 to be exposed to downstream fluid pressure acting through the space 142 and the ring passages 143 as indicated by the arrows in FIGURE 15. The space 144 at the outer periphery of ring 135 is exposed to the fluid pressure of body space 14.

FIGURE 16 illustrates the action at ring 54' when the fluid pressure in space 14 exceeds that downstream of the plug. The resilient ring 135 is rapidly contracted to the position of FIGURE 16 when the body internal pressure is higher than downstream pressure, thereby separating the sides of ring 135 from faces 137 and 138 and allowing pressure relief in the direction of the arrows in FIGURE 16.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of making a preformed plug seating ring for a ball type valve assembly comprising the steps of providing a relatively rigid ring of resilient metal having an annular arcuate surface at one side, mounting said ring in a fixture and deforming said ring axially of said surface with a predetermined force, accurately forming said surface to temporary spherical contour while the ring is held deformed in said fixture, and releasing said ring from the fixture to allow said formed surface to assume a desired non-spherical contour as the ring resiliently tends to resume its initial condition.

2. In the method defined in claim 1, said desired contour being substantially that assumed by the initially spherical surface of a ball plug exposed to full upstream line pressure, and said force being selected to sufficiently deform said ring that after said temporary spherical surface is formed it will relax to said contour when the ring is released from said fixture.

3. In the method defined in claim 1, said temporary spherical surface being formed by lapping engagement with a sphere of the initial curvature of the plug with which the seat ring is to be used.

4. In the method defined in claim 3, said sphere being the plug with which the seat ring is to be used.

References Cited

UNITED STATES PATENTS

| 1,960,385 | 5/1934 | Lofgren | 29—157 |
| 3,042,066 | 7/1962 | Wolfensperger | 251—315 |

RICHARD J. HERBST, Primary Examiner

U.S. Cl. X.R.

29—157.1, 557